Sept. 27, 1949.　　　　　A. L. LEE　　　　　2,483,345
BEARING AND SHAFT ASSEMBLY
Filed May 17, 1948
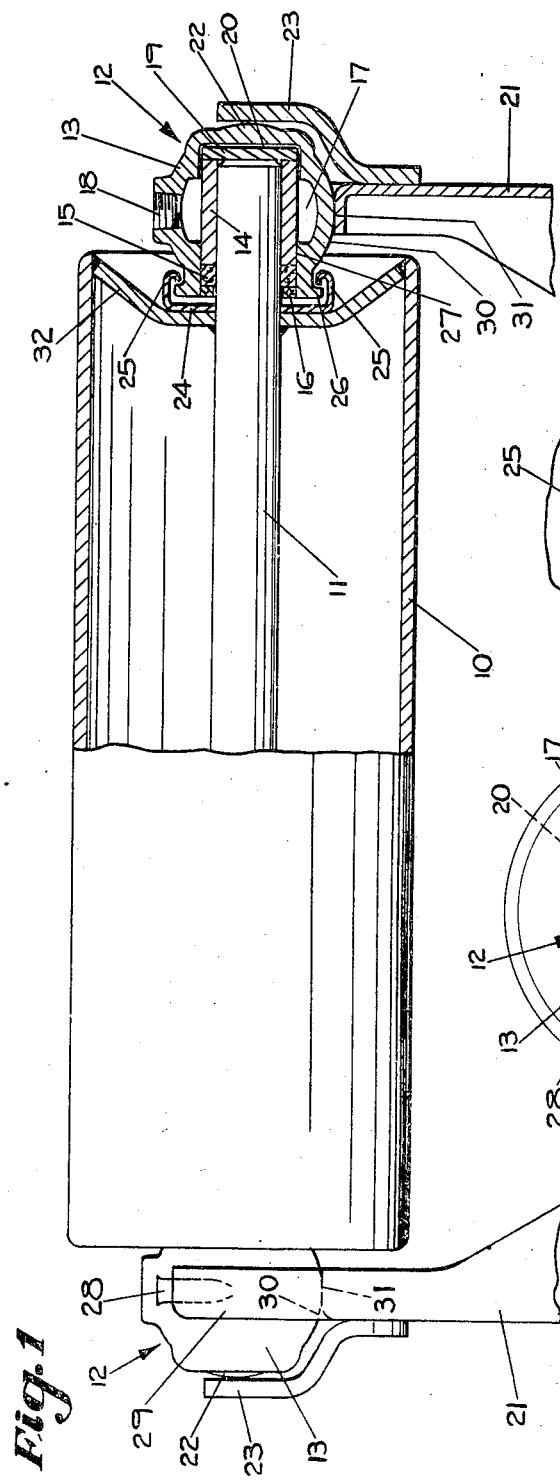
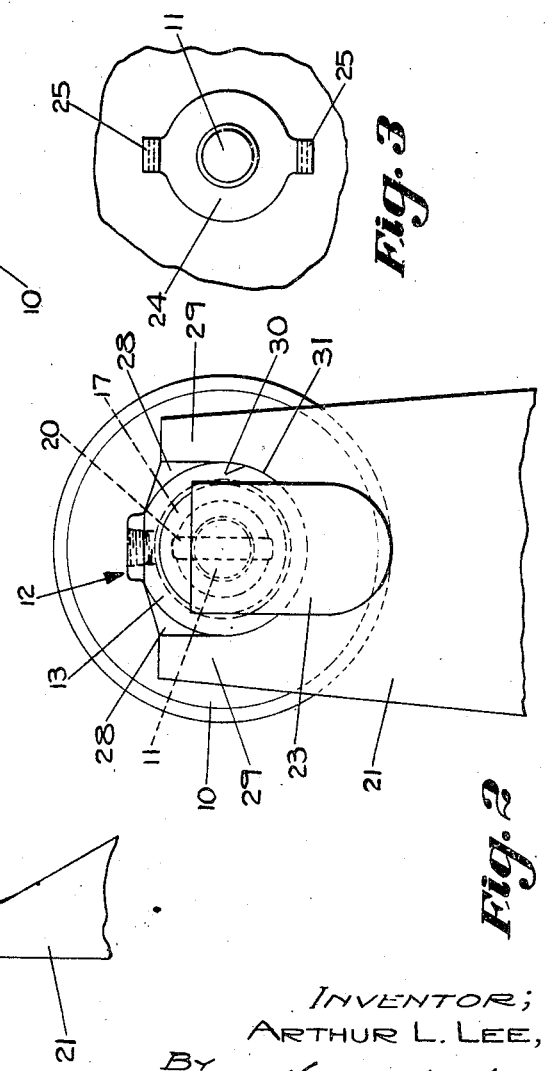
INVENTOR;
ARTHUR L. LEE,
BY
Attorney.

Patented Sept. 27, 1949

2,483,345

UNITED STATES PATENT OFFICE 2,483,345

BEARING AND SHAFT ASSEMBLY

Arthur L. Lee, Upper Arlington, Ohio, assignor to The Jeffrey Manufacturing Company, a corporation of Ohio Original application May 21, 1945, Serial No. 595,048. Divided and this application May 17, 1948, Serial No. 27,552

4 Claims. (Cl. 308—20)

This invention relates to a belt idler and particularly to a bearing assembly for a belt idler.

It is one object of my invention to provide an improved less expensive bearing and shaft assembly including interlocking means to prevent accidental removal of the bearing assembly from the shaft without any frictional contact between the interlocking means during operation of the device.

Another object of my invention is to provide an improved bearing housing.

A further object of my invention is to provide an improved washer-like clip adapted to be secured to a shaft and including arms, wings or lugs adapted to co-operate with a flange of a bearing housing for preventing accidental removal of the bearing housing from the shaft to which the washer-like clip is rigidly secured.

Other objects of my invention will appear hereinafter the novel features and combinations being set forth in the appended claims.

In the accompanying drawing,

Fig. 1 is an elevational view with parts in section, showing an idler and bearing assembly incorporating the features of my invention;

Fig. 2 is an end view of the device of Fig. 1; and

Fig. 3 is a partial end view of the idler of Figs. 1 and 2 with the bearing assembly removed.

This application is a division of my co-pending application, Serial No. 595,048, filed May 21, 1945, for an Idler and bearing assembly.

It is to be understood that the construction and operation of the bearing and shaft assembly of this application follows that of my parent application, above identified, and that only the subject matter pertinent to the present invention is described in detail herein.

Referring particularly to Figs. 1 and 2 of the drawing, there is illustrated a belt idler supported on and between a pair of spaced stands, brackets or supports and including an idler roller 10 provided with a live shaft 11 which is welded or otherwise rigidly attached to the spaced end plates 32 of the cylindrical body of the roller 10. Live shaft 11 has end portions which extend outwardly therefrom and each of these ends of the shaft 11 is supported for rotation by a bearing assembly 12. Each bearing assembly 12 includes a housing or casing 13 having a cylindrical bore 27 into which is pressed a bushing or sleeve 14 of porous metal.

Adjacent the inner end of bushing or sleeve 14 and within the cylindrical bore 27 of the housing or casing 13 is a felt washer or seal 15 which fits on the shaft 11 and which is held in the housing 13 by a holding ring 16 which preferably has a press fit with the cylindrical bore 27 in said housing 13. The interior of the housing 13 is provided with a circumferential chamber, cavity or reservoir 17 adapted to receive oil, said reservoir 17 having direct communication with the external cylindrical surface of the porous bushing 14 so that lubricating oil within the reservoir 17 can readily flow into the pores of the said bushing 14. A top opening by which oil is introduced into the chamber or cavity 17 is closed tightly with a pipe plug 18 or the like to prevent loss of oil and also to prevent entrance of air and foreign matter into the chamber or reservoir 17.

As seen in Fig. 1 of the drawing, the bushing or sleeve 14 is open at both ends and adjacent its outer end is provided with a separate thrust means in the form of a plate 19 preferably made of the same material as the bushing or sleeve 14. The thrust plate 19 abuts the outer wall of the cylindrical bore 27 in the housing 13. An oil groove or slot 20 is cored or otherwise formed in the housing 13 with its opposite ends communicating with diametrically opposite positions in the chamber 17 to provide for the flow of oil to thrust plate 19.

The theory of operation or the "oil-less" features of the bearing is described and claimed in my parent application, Serial No. 595,048, above identified.

As seen in Figs. 1 and 2, a substantial portion 30 of the outer surface of casing or housing 13 is formed as a segment of a sphere so as to provide a rolling bearing surface with a co-operating U-shaped bearing surface 31 provided by supporting bracket or stand 21. As seen particularly in Fig. 2, the spherical surface 31 referred to lies below the axis of shaft 11 and extends through an arc of substantially 180 degrees where its ends fair into wings or lugs 28 that fit snugly between the spaced upstanding legs 29 of the bracket or stand 21. Wings or lugs 28 interfit and co-operate with the upstanding legs 29 of the supporting bracket or stand 21 to prevent rotation of the bearing housing 13 with respect to the supporting bracket 21 about the axis of shaft 11. Because the bearing sits in the U-shaped bracket 21 and because of its spherical supporting surface, the housing 13 is free to oscillate within the supporting bracket or stand 21, but because of the co-operating wings or lugs 28 and the upstanding legs 29 it cannot rotate in the supporting bracket or stand 21. Thus my improved housing and support therefor provide a self-aligning feature for each of the two spaced bearing assemblies 12 and the associated shaft 11.

End thrust transferred by the shaft 11 to either housing 13 through the end thrust plates 19 is also transmitted through a bearing surface in the form of a segment of a sphere which is directly opposite the end of shaft 11 and thrust plate 19, as seen at 22 in Fig. 1, to a thrust clip 23 rigidly attached to bracket or stand 21. This self-aligning feature is generally similar to that disclosed and claimed in my application, Serial No. 763,822, filed July 26, 1947, entitled "Conveyor belt supporting mechanism," which is a division of my application, Serial No. 581,630, filed March 8, 1945, for a "Belt conveyer."

It is evident that, in the absence of some retaining means, each bearing assembly 12 may be readily removed from the co-operating projecting portion of the shaft 11 by the simple expedient of removing it longitudinally therefrom. To provide means to hold each bearing assembly 12 on the shaft 11 thereby preventing its accidental removal and thus precluding its becoming lost when the idler assembly is removed from the brackets or stands 21, metal spring clips 24 rigidly attached to the end plates 32 of the roller 10 and shaft 11, as by welding or the like, are employed. As seen in Figs. 1 and 3, each clip 24 has a washer-like body that fits over the shaft 11 and is secured thereto rigidly as by welding it to its adjacent end plate of the roller body or the shaft 11. Each spring clip 24 includes a pair of diametrically spaced bent over wings, lugs or hooked legs 25 which extend from the washer-like body substantially at right angles thereto and interfit and shroud an adjacent outwardly extending peripheral flange 26 formed on the inner edge of the housing 13, that is, the edge or side of the housing 13 which is opposite the spherical bearing surface 22 and adjacent an end plate 32 of the roller body. The spring in the wings 25 of each clip 24 provides for readily interlocking them and the flange 26 by the simple expedient of placing the housing 13 on the shaft 11 with its flange 26 adjacent the inwardly bent free or hooked ends of the wings or hooks 25 and by bumping the housing to cause the wings or hooks 25 to spring outwardly over the flange 26 until the parts are in the positions illustrated at the right in Fig. 1 of the drawing. In this position it is obvious that removal of the housing 13 is not permitted without an operator inserting a tool or otherwise spreading the wings 25 apart to free the interlocking relation between them and said peripheral flange 26. However, there is complete clearance between the flange 26 and the retaining clip 24 so that during operation of the idler little or no friction whatever is developed by this interlocking means.

It is one function of the spherical end bearing surface 22 and the clip 23 to retain the bearing housing 13 spaced upon the end of shaft 11 so that the end of the shaft 11 is always closely adjacent or abutting the thrust plate 19 thereby maintaining the proper spacing of the hooked portion of the wings or lugs 25 with respect to the peripheral flange 26. Because the idler roll 10 with its attached bearings 12 is carrried between the spaced supporting stands or brackets 21 and because the spherical surface 22 of each of the housings 13 is abutted by a thrust clip 23, the idler roll is at all times properly spaced between the supporting brackets or stands 21 and the proper clearance is always maintained between the wings or lugs 25 and the peripheral flanges 26 of each bearing 12.

It will be seen that the co-operating interlocking means 25 and 26 as well as the self-aligning and radial load and thrust load taking features are applicable to anti-friction bearings such as of the ball and roller type as well as to the bushed bearings herein specifically illustrated.

From the foregoing it is apparent that I have provided an improved bearing and shaft assembly which may be assembled at the time of manufacture and shipped with the bearings mounted upon the ends of the shaft thereof and that the bearings cannot become inadvertently removed and lost during shipment and storage of the rollers. It is also apparent that because the bearings can only be purposefully removed from the shaft that they will be sealed against the entry of dirt and foreign matter. It will be seen also that the placing of the bearings upon the shaft is a simple operation in that the bearing is merely slid upon the shaft until its peripheral shoulder 26 engages the inwardly hooked ends of the wings or legs 25 and the bearing is then given a sharp bump causing it to spring the wings or lugs 25 outwardly and to snap over the peripheral flange 26.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A bearing and shaft assembly including a shaft, a bearing supporting said shaft for rotation relative thereto, a housing for said bearing, said housing having a peripheral flange, and a clip attached to said shaft and shrouding said flange to prevent its dropping off said shaft while providing for free relative rotation of said shaft and bearing.

2. An idler roll adapted to support a belt of a conveyer including a tubular body having spaced end plates, a shaft extending axially through said body and end plates welded to the latter and projecting outwardly therefrom to receive a supporting bearing, and a spring clip rigidly attached to each of said end plates, each adapted to snap over a flange of a bearing housing received by each end of said shaft for preventing accidental removal of said bearings from said shaft.

3. An idler roll adapted to support a belt of a conveyer including a tubular body having spaced end plates, a shaft extending axially through said body and end plates welded to the latter and projecting outwardly therefrom to receive a supporting bearing, and a clip rigidly attached to each of said end plates, each adapted to fit over a flange of a bearing housing received by each end of said shaft for preventing accidental removal of said bearings from said shaft.

4. A bearing housing for a bearing adapted to support a live shaft of a conveyer roller including an outer generally spherical end surface axially opposite a bearing receiving bore therein, a generally spherical supporting surface below the axis of the bore, and a peripheral flange surrounding the end of said housing opposite said generally spherical end surface adapted to cooperate with a clip carried by said live shaft when in said bore for preventing accidental removal of said housing from said live shaft.

ARTHUR L. LEE.

REFERENCES CITED

The following references are of record in the file of this patent:

UNITED STATES PATENTS

| Number | Name | Date |
| --- | --- | --- |
| Re. 22,882 | Popp | May 20, 1947 |
| 1,572,093 | Stebler | Feb. 9, 1926 |
| 1,772,577 | Knap | Aug. 12, 1930 |